United States Patent
Wright et al.

(10) Patent No.: US 9,568,211 B1
(45) Date of Patent: Feb. 14, 2017

(54) AIRCRAFT AIR SUPPLY HOSE INLINE FILTER

(71) Applicant: Twist, Inc., Jamestown, OH (US)

(72) Inventors: Joe W. Wright, Xenia, OH (US); Scott E. Schrinner, Jamestown, OH (US)

(73) Assignee: Twist, Inc., Jamestown, OH (US)

( * ) Notice: Subject to any disclaimer, the term of this patent is extended or adjusted under 35 U.S.C. 154(b) by 72 days.

(21) Appl. No.: 14/269,846

(22) Filed: May 5, 2014

Related U.S. Application Data

(60) Provisional application No. 61/819,154, filed on May 3, 2013.

(51) Int. Cl.
  *B01D 46/08* (2006.01)
  *B64F 1/20* (2006.01)
  *F16L 31/00* (2006.01)
  *B01D 46/42* (2006.01)
  *B01D 51/10* (2006.01)
  *F24F 13/02* (2006.01)

(52) U.S. Cl.
  CPC ............... *F24F 13/0218* (2013.01)

(58) Field of Classification Search
  CPC . B01D 46/0012; B01D 39/2062; B01D 46/08; B01D 46/42; B01D 51/10; B64F 1/362; B64F 1/20; F16L 27/0828; F16L 31/00
  USPC ......... 55/331, 385.3, 418, 503; 96/134, 422; 285/280, 260, 148.15; 138/119
  See application file for complete search history.

(56) References Cited

U.S. PATENT DOCUMENTS

| | | | | |
|---|---|---|---|---|
| 5,368,341 A | * | 11/1994 | Larson | B64F 1/362 138/119 |
| 5,888,260 A | * | 3/1999 | Sica | B01D 46/0012 55/331 |
| 8,174,396 B1 | * | 5/2012 | Schrinner | B64F 1/20 141/383 |
| 8,567,064 B1 | * | 10/2013 | Wright | F16L 31/00 285/260 |
| 2003/0019361 A1 | * | 1/2003 | Wolff | B01D 39/2062 96/134 |
| 2008/0054631 A1 | * | 3/2008 | Gosis | B64F 1/362 285/280 |
| 2008/0289305 A1 | * | 11/2008 | Girondi | B01D 46/0012 55/385.3 |
| 2010/0000186 A1 | * | 1/2010 | Newell | B01D 46/0043 55/418 |
| 2011/0042939 A1 | * | 2/2011 | Mustar | F16L 27/0828 285/148.15 |
| 2011/0067574 A1 | * | 3/2011 | Walz | B01D 46/08 96/422 |

(Continued)

*Primary Examiner* — Jacob T Minskey
*Assistant Examiner* — Minh-Chau Pham
(74) *Attorney, Agent, or Firm* — Wood Herron & Evans LLP

(57) ABSTRACT

A flexible air hose connection between a preconditioned air unit and an aircraft incorporates an air filter between the first and second ends to capture and filter foreign matter in the air stream through the flexible tube. The filter may be sewn, fitted with snaps, hook and loop and/or zippered into the interior of the air hose. In particular embodiments the air filter incorporates a mesh screen, or alternatively comprises a fibrous material of foam, pleated paper, or spun fiberglass. In one embodiment the filter may be a high efficiency particulate air (HEPA) filter meeting the efficiency standard set by the Department of Energy.

11 Claims, 3 Drawing Sheets

(56) References Cited

U.S. PATENT DOCUMENTS

2014/0102125 A1\* 4/2014 Tinde .................. B64F 1/362
62/237

\* cited by examiner

AIRCRAFT AIR SUPPLY HOSE INLINE FILTER

RELATED APPLICATIONS

The present inventions claims priority to U.S. Provisional Application Ser. No. 61/819,154 filed May 3, 2013, which is incorporated herein in its entirety.

FIELD OF THE INVENTION

The present invention relates to air supply hoses that are used with commercial airliners.

BACKGROUND

It is generally known to supply commercial aircraft with conditioned air for heating and cooling when the aircraft is stationary at a gate. In this application, the terminal or gate is meant to refer to any place that an aircraft receives or discharges passengers or cargo. This may be by way of a telescoping corridor (also referred to as a walkway, bridge way, jet bridge), stairs, or any other facility.

As illustrated diagrammatically in FIG. 1, typically, conditioned air is supplied to the aircraft 14 via a flexible hose 10 connected to a pre-conditioned air (PCA) 12 unit associated with the gate that is a part of the airport terminal. The PCA unit 12 may produce heated air or cooled air depending on the needs of the aircraft 14 it is servicing. The PCA outputs its air into a duct that may be rigid or flexible, and then the air is delivered from the gate to the aircraft with a flexible and usually insulated air hose 10 which is installed to the aircraft 14 by a service technician 16 while the aircraft is parked at the gate.

Devices for deploying and retracting a hose are shown in U.S. Pat. Nos. 6,821,201, 6,776,705, and 6,834,668 to Bombardi et al., which are hereby incorporated herein by reference in their entirety. An improved hose management system is described in U.S. patent application Ser. No. 12/025,022 filed Feb. 2, 2008 by Wright et. al, and assigned to the assignee of the present application, which is hereby incorporated herein by reference in its entirety. Structures of an air hose are shown in detail in U.S. patent application Ser. No. 13/030,963 filed Feb. 18, 2011, assigned to the assignee of the present application, which is incorporated by reference herein in its entirety. Structures of a coupling for use between a hose and aircraft are shown in detail in U.S. patent application Ser. No. 12/861,298 filed Aug. 23, 2010, assigned to the assignee of the present application, which is incorporated by reference herein in its entirety.

A difficulty that arises with ventilation systems of this kind is the possible introduction of foreign matter into the air stream. The foreign matter can include paper, plastic, lint or other typical material that clogs an air flow path. If this matter invades the air delivery systems of the aircraft it can be very expensive to remove, not just as a result of labor cost but also because the cleaning process necessitates airplane downtime. Thus, there is a need for an improved air handling system that can reduce the amount of foreign matter introduced into airplane ventilation systems to thus reduce expenses and downtime.

Although this background has described the use of air hoses with reference to servicing aircraft, similar hose has other uses, for example ventilating confined working spaces such as sewers, tanks, and utility tunnels, and principles of the present invention are equally applicable in such contexts.

SUMMARY OF INVENTION

The present invention provides a flexible air hose including a coupler at a first end for connection to a preconditioned air unit and a coupler at a second end for connection to an aircraft, comprising a flexible tube between the ends with a central air passageway, where the air passageway incorporates an air filter between the first and second ends to capture and filter foreign matter in the air stream through the flexible tube.

The filter may be sewn, fitted with snaps, hook and loop and/or zippered into the interior of the air hose.

In particular embodiments the air filter comprises a mesh screen, or alternatively comprises a fibrous material of foam, pleated paper, or spun fiberglass.

In one embodiment the filter may be a high efficiency particulate air (HEPA) filter meeting the efficiency standard set by the Department of Energy.

The above and other objects and advantages of the present invention shall be made apparent from the accompanying drawings and the description thereof.

The accompanying drawings, which are incorporated in and constitute a part of this specification, illustrate embodiments of the invention and, together with the general description of the invention given above, and the detailed description given below, serve to explain the principles of the invention.

DETAILED DESCRIPTION

Figure 1:
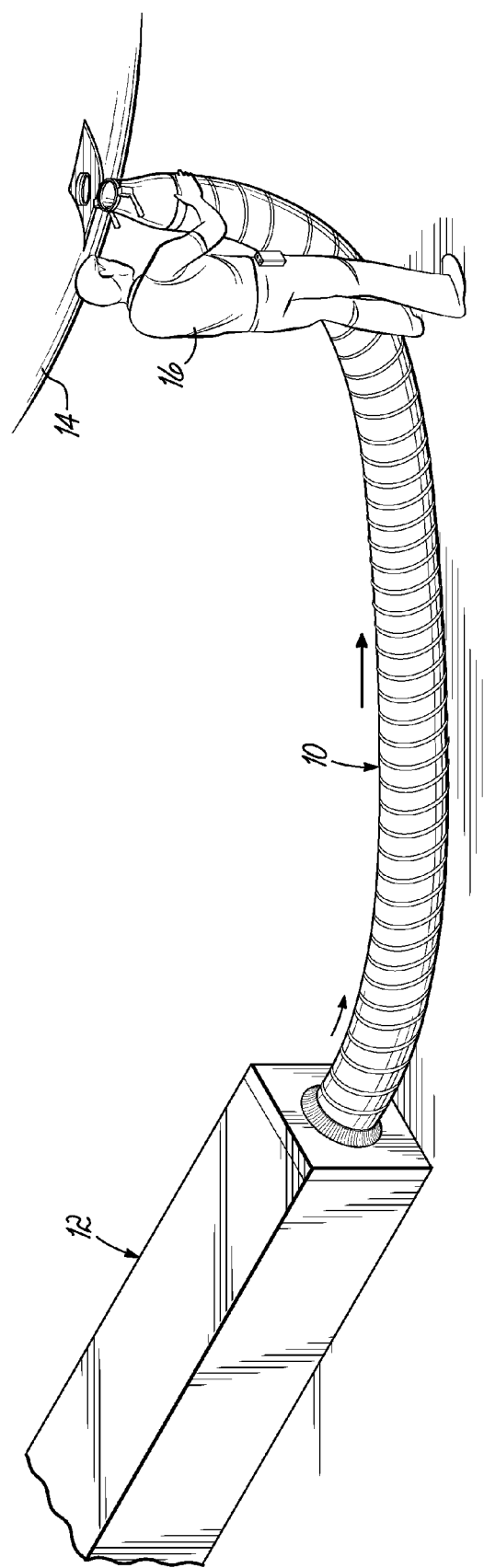
FIG. 1 is perspective schematic illustration of the use of an air hose in servicing an airplane.

FIG. 1 illustrates an aircraft ventilation hose 10 extending along the ground from a preconditioned air unit 12 to an aircraft 14. As seen in the illustration, a technician 16 has extended the hose along the ground and is installing the hose in the air inlet of the aircraft 14.

Figure 2:
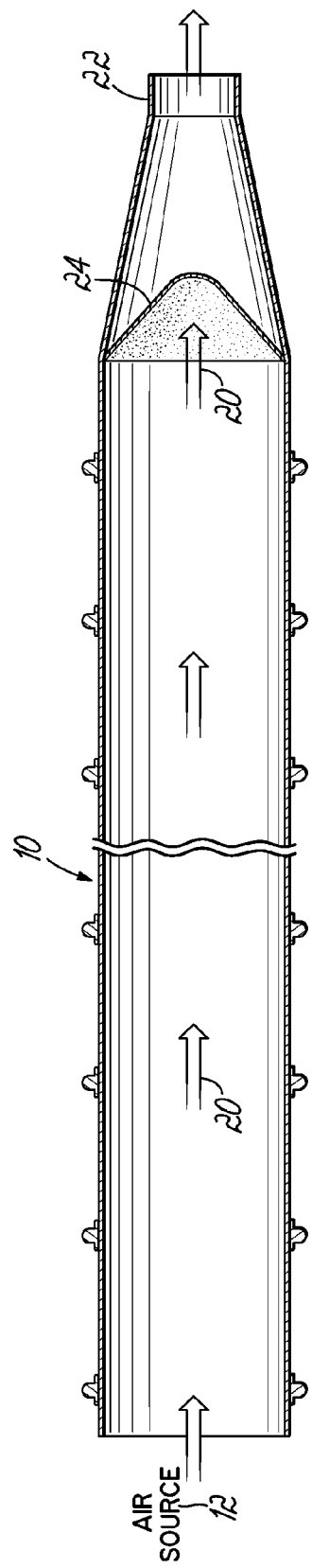
FIG. 2 is a cross-sectional view, illustrating an air hose in accordance with principles of the present invention.
Figure 3:
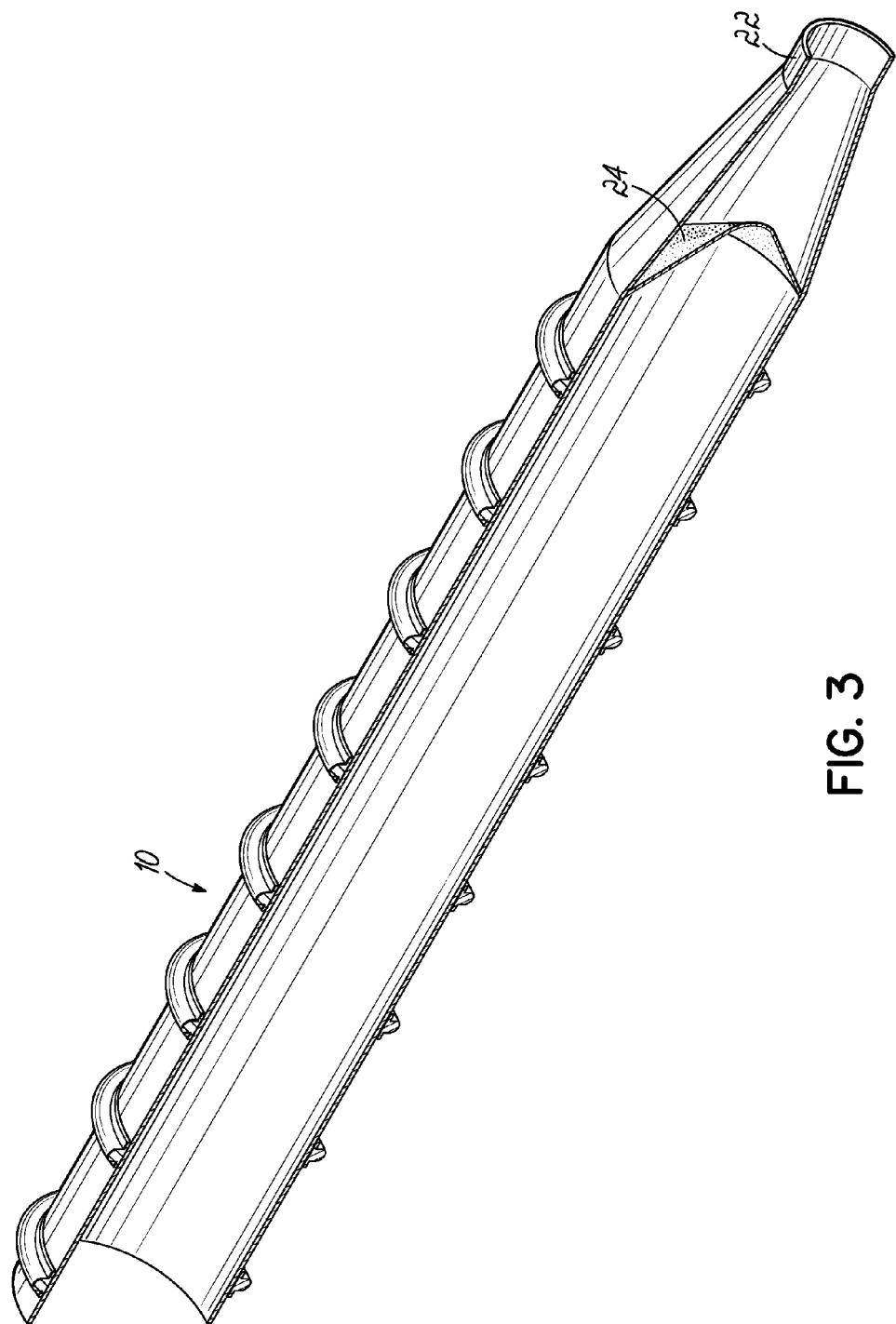
FIG. 3 is a perspective cross-sectional view of the air hose of FIG. 2

FIG. 2 shows a cross section of the hose 10 of FIG. 1 and FIG. 3 is a perspective view of the hose 10 of FIGS. 1 and 2. Air from the air source 12 flows into the air passageway formed by the hose 10, generally in the direction shown by arrow 20, toward the aircraft outlet 22. The hose incorporates an inline screen or filter 24 to capture foreign matter that may enter the hose or in some cases be created by rips or tears in the fabric of the hose itself.

The filter 24 shown in FIGS. 1 and 2 may be made of a mesh or screen material to create a filter for items contained in the airflow that must be collected prior to discharge from the hose. The filter 24 may be made from various materials but will have voids for passing air while blocking contaminates. The filter may be sewn, fitted with snaps, hook and loop, zippered, or any combination to place it in the air stream. It may be permanent or removable based on construction. It may be positioned anywhere in the hose but will most commonly be found at the exit end in order to allow the filter to capture foreign matter created by deterioration of the hose 10 as well as any upstream sources.

The purpose of the filter is to trap all contaminates in the air stream. Contaminates may be pieces of the hose construction including but not limited to the hose's inside liner and insulation. It may also contain items that entered the hose through cuts and tears such as small animals or additional debris. Collection of contaminates will lead to a visible indicator of the hose condition and will prevent contaminates from reaching the final destination of the hose.

The filter covers the entire area of the inside of the hose. Inspection of the filter will determine of contaminates have been collected. If contaminates are detected the section containing the filter can be detached from the delivery hose and the filter cleaned by inverting or removing and spraying if necessary. The filter can then be inspected and if approved placed back in line of the delivery hose. This will allow the filter to catch contaminates, be an indicator to the hose condition, and is reusable as long as the construction is sound.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A flexible air hose for use with aircraft, comprising:
   a. a flexible tube defining an air passageway between a first end and a second end,
   b. a first end of the flexible tube defining an opening connectable to a source of preconditioned air,
   c. a second end of the flexible tube comprising a coupler for connection to an aircraft, and
   d. an air filter attached to the interior of the flexible air hose between the first and second ends and covering the entire air passageway to capture and filter foreign matter in the air stream through the hose.

2. The flexible air hose of claim 1 wherein the filter is sewn to the interior of the air hose.

3. The flexible air hose of claim 1 wherein the filter is fitted to the interior of the air hose with snaps.

4. The flexible air hose of claim 1 wherein the filter is fitted to the interior of the air hose with hook and loop fasteners.

5. The flexible air hose of claim 1 wherein the filter is fitted to the interior of the air hose with a zipper.

6. The flexible air hose of claim 1 wherein the filter comprises a mesh screen.

7. The flexible air hose of claim 1 wherein the filter comprises a fibrous material.

8. The flexible air hose of claim 1 wherein the filter comprises a foam.

9. The flexible air hose of claim 1 wherein the filter comprises pleated paper.

10. The flexible air hose of claim 1 wherein the filter comprises spun fiberglass.

11. The flexible air hose of claim 1 wherein the filter is a high efficiency particulate air (HEPA) filter meeting the efficiency standard set by the Department of Energy.

* * * * *